United States Patent [19]

Brambley et al.

[11] Patent Number: 4,787,694
[45] Date of Patent: Nov. 29, 1988

[54] OPTICAL FIBRE POLARIZER

[75] Inventors: Roger J. Brambley, Romsey; David N. Payne, Bursledon, both of Great Britain

[73] Assignee: STC PLC, London, England, England

[21] Appl. No.: 25,945

[22] Filed: Mar. 16, 1987

[30] Foreign Application Priority Data

Mar. 19, 1986 [GB] United Kingdom ............... 8606736

[51] Int. Cl.$^4$ ................................................ G02B 6/34
[52] U.S. Cl. ............................. 350/96.19; 350/96.29; 350/162.2
[58] Field of Search ............ 350/96.15, 96.16, 96.19, 350/96.29, 96.30, 162.17, 162.2, 162.23; 250/227, 552

[56] References Cited

U.S. PATENT DOCUMENTS

| 3,931,518 | 1/1976 | Miller | 250/227 |
| 4,135,780 | 1/1979 | Dyott | 350/96.15 |
| 4,268,116 | 5/1981 | Schmadel et al. | 350/96.29 |
| 4,342,907 | 8/1982 | Macedo et al. | 250/227 |
| 4,530,078 | 7/1985 | Lagakos et al. | 350/96.29 X |

FOREIGN PATENT DOCUMENTS

| 1521778 | 8/1978 | United Kingdom . |
| 2125572 | 3/1984 | United Kingdom . |
| 2140167 | 11/1984 | United Kingdom . |
| 2161609A | 1/1986 | United Kingdom | 350/96.19 |

OTHER PUBLICATIONS

Sorin et al., "A Single-Mode Fiber Evanescent Grating Reflector," *J. of Lightwave Tech.*, vol. Lt-3, No. 5, Oct. 1985, pp. 1041-1043.

Bulmer et al., "Single Mode Grating Coupling Between Thin-Film and Fiber Optical Waveguides," *IEEE J. of Quantum Electronics*, vol. QE-14, No. 10, Oct. 1978, pp. 741-749.

Primary Examiner—John D. Lee
Attorney, Agent, or Firm—Lee & Smith

[57] ABSTRACT

A frequency selective optical polarizer is formed by pressing a length of single mode polarization maintaining fiber 12 against a ribbed plate 10 in order to generate a distributed strain pattern with a periodicity which causes for a particular optical frequency one of the guided modes to couple into an unguided mode while the other guided mode remains substantially uncoupled.

2 Claims, 2 Drawing Sheets

OPTICAL FIBRE POLARIZER

BACKGROUND OF THE INVENTION

This invention relates to an optical fibre polariser which attenuates one plane of polarisation of propagating light preferentially with respect to the attenuation of light propagating with the orthogonal plane of polarisation.

One form of optical fibre polariser is known in which polarisation maintaining fibre is wound into a coil in such a way as to provide a noticeably higher bending loss for one plane of polarisation than for the other. The present invention is concerned with an alternative form of polariser in which the manner of achieving selectivity of attenuation between the two planes of polarisation is such that constructions of polariser are possible which include a facility for varying, at least over a limited frequency range, the light frequency at which selectivity occurs, and a facility for altering the strength of that selectivity.

SUMMARY OF THE INVENTION

According to the present invention there is provided a polariser which for a given optical frequency exhibits differential attenuation of light of two planes of polarisation, which polariser is constituted by a length of polarisation maintaining single mode fibre strained at regular intervals along a region of its length at a periodicity that promotes for said given frequency coupling of one of the orthogonal guided modes of the fibre into an unguided mode, which coupling is strong compared with the coupling it induces at that given frequency between the other guided mode of the fibre and any unguided mode.

A polariser constructed in accordance with the teachings of the present invention makes use of the effects of producing localised strain at appropriately spaced intervals down its length so as to induce optical coupling between a guided mode and at least one other mode.

In United Kingdom Patent Specification No. GB-A-2125572 there is described a use of this effect in a sensor system in which the parameter being sensed is arranged to apply strain at periodic intervals down a length of optical fibre so as to induce coupling between two guided modes, while in United Kingdom Patent Specification No. GB-A- 2125572 there is described a related form of sensor in which the strain is employed to induce coupling between the guided mode of a single mode fibre and at least one unguided mode.

The polariser of the present invention has some features in common with the sensor elements of the sensor systems of both these referenced patent specifications. Thus it has a similarity with the sensor systems described in No. GB-A-2155621 in that it relies for its operation upon inducing optical coupling between a guided mode and at least one unguided mode, but differs from those sensor systems in that the fibre is a polarisation maintaining fibre that supports a pair of non-degenerate guided modes of orthogonal polarisation. One example of sensor system described in No. GB-A-2125572 also employs polarisation maintaining fibre that supports a pair of non-degenerate guided modes of orthogonal polarisation, but the periodicity of induced strain in that instance is of a value to produce coupling between these two guided modes, whereas in the polariser of the present invention a different periodicity is used, namely one that produces coupling between one of the guided modes and at least one unguided mode, this coupling being strong compared with the coupling produced between the other guided mode and any unguided mode.

BRIEF DESCRIPTION OF THE DRAWINGS

There follows a description of a polariser embodying the invention in a particular form. The description refers to the accompanying drawings in which.

DETAILED DESCRIPTION OF THE PREFERRED EMBODIMENT

Figure 1:
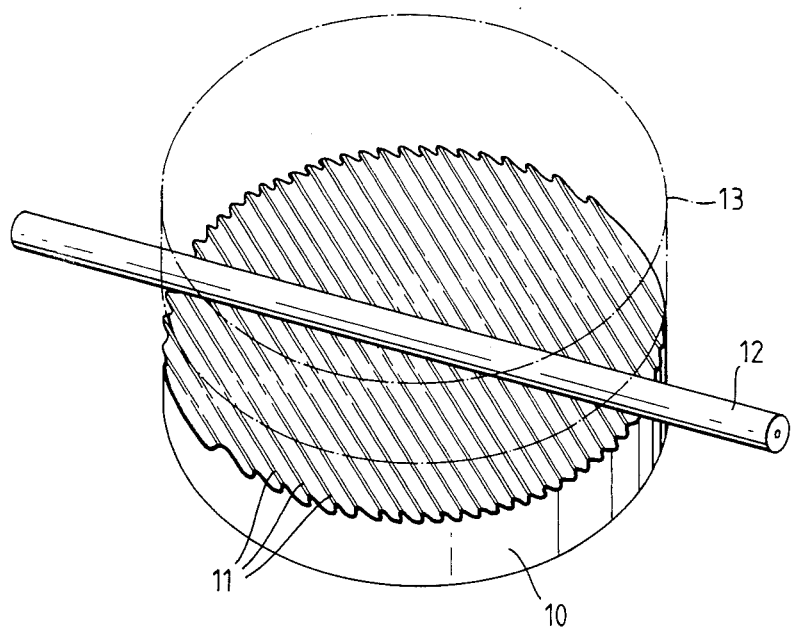
FIG. 1 is a schematic representation of the components of the polariser.

Referring to FIG. 1, a plate 10 has a set of parallel grooves machined in its upper surface to form a set of uniformly spaced ribs 11 with rounded tops. A length of plastics protective coated polarisation maintaining single mode fibre 12 is laid across the ribs at some particular angle and pressed against them by the application of a pressure pad 13.

In a particular example the plate 10 was about 15 cm in diameter and its grooves were at a pitch of 0.5 mm, while the polarisation maintaining fibre 12 had a beat length of 1.8 mm, and the pressure pad 13 was adjusted to provide a load of about 2.5 kg. To assess the performance of the arrangement as a polarisation sensitive filter, light from a monochromator (not shown) was directed into one end of the fibre, while tee light emerging from the other end was directed on to a photodetector (not shown) via a polariser (not shown) whose orientation could be changed to select either one of the principal planes of the fibre.

Figure 2:
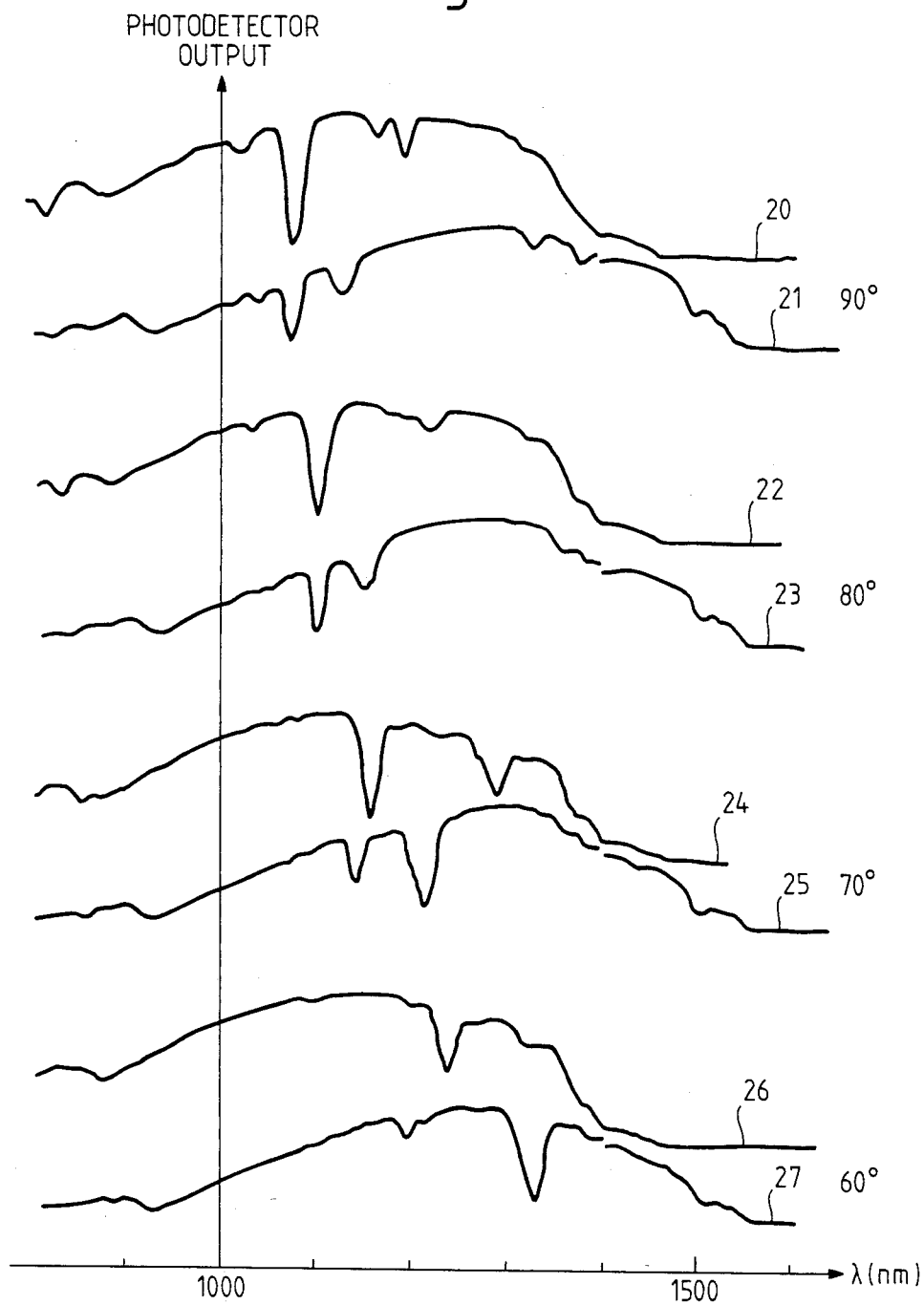
FIG. 2 is a graph showing the response, as a function of wavelength, of a photodetector positioned to receive light transmitted down the fibre of the two polarisations for various angles of orientation of the fibre across its grating.

Traces 20 and 21 of FIG. 2 show the output of the photodetector as a function of wavelength for the two polarisations when the fibre was aligned at 90° to the direction of the grooves. Trace 20 has been displaced vertically with respect to trace 21 so that they can be more readily distinguished from each other. In the case of trace 20, the minimum at about 870 nm indicates the cut-off wavelength for that polarisation. The corresponding minimum at about 920 nm for trace 21 indicates the cut-off wavelength for the other polarisation.

Traces 22 and 23 were obtained when the fibre was realigned to be at 80° to the direction of the ribs thereby lengthening the pitch of the strain pattern imposed on the fibre. Similarly traces 24 and 25 were obtained with the fibre inclined at 70° while traces 26 and 27 were obtained with the fibre inclined at 60°.

Traces 20 and 21 show a relatively strong attenuation in the region of 1070 nm where both guided modes are coupled into unguided modes, but the attenuation peaks overlap and hence are not in this instance usable to form the basis of a polariser. However, with the longer pitch of the strain pattern provided by inclining the fibre at only 70° to the grooves, an attenuation peak is found to be present in trace 25 at about 1200 nm where no corresponding attenuation peak is to be found in trace 24, and hence under these conditions, and at this wavelength, the device is functioning as a polariser. Similarly, with the fibre inclined at 60° to the grooves, the separated attenuation peaks of traces 26 and 27, respectively at approximately 1240 nm and 1330 nm, allow this arrangement to function as a polariser at either of these wavelengths. In this particular example, which has not been subjected to any special optimisation procedures, discrimination between the two polarisation planes was found to be typically of the order of 20 dB.

A particular feature of this polariser is that, without otherwise disturbing the optical system, the attenuation of the unwanted polarisation can simply be removed merely by releasing the pressure plate loading.

We claim:

1. A polariser which for a given optical frequency exhibits differential attenuation of light of two orthogonal planes of polarisation, which polariser is constituted by a length of polarisation maintaining single mode fibre strained at regular intervals along a region of its length at a periodicity that promotes, for said given frequency, coupling of one of the two orthogonally polarized guided modes of the fibre into an unguided mode, which coupling is strong compared with the coupling it induces at that given frequency between the other of the two orthogonally polarized guided mode of the fibre and any unguided mode.

2. A polariser as claimed in claim 1 wherein the fibre is strained at regular intervals along a region of its length by being pressed against a rib grating.

* * * * *